(12) United States Patent
Berger et al.

(10) Patent No.: US 11,472,488 B2
(45) Date of Patent: Oct. 18, 2022

(54) MUDFLAP AERO STRAKE

(71) Applicant: GM GLOBAL TECHNOLOGY OPERATIONS LLC, Detroit, MI (US)

(72) Inventors: Richard A. Berger, Shelby Township, MI (US); Alexander N. Nastov, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 17/102,977

(22) Filed: Nov. 24, 2020

(65) Prior Publication Data

US 2022/0161864 A1 May 26, 2022

(51) Int. Cl.
*B62D 25/18* (2006.01)
*B62D 35/00* (2006.01)

(52) U.S. Cl.
CPC ............. *B62D 25/18* (2013.01); *B62D 35/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,070,893 A | * | 6/2000 | Thorndyke | B60R 19/00 280/768 |
| 9,221,390 B1 | * | 12/2015 | Begley | B62D 35/001 |
| 9,284,000 B1 | * | 3/2016 | Smith | B62D 25/188 |
| 9,440,689 B1 | * | 9/2016 | Smith | B62D 35/02 |
| 10,829,161 B1 | * | 11/2020 | Vu | B62D 25/18 |
| 2020/0361545 A1 | * | 11/2020 | Nichols | B62D 35/02 |

FOREIGN PATENT DOCUMENTS

DE 102014106372 A1 * 11/2015 ........... B60K 11/085

\* cited by examiner

*Primary Examiner* — Lori L Lyjak
(74) *Attorney, Agent, or Firm* — Quinn IP Law

(57) ABSTRACT

A mudflap-integrated aerodynamic member for improving aerodynamic characteristics of a motor vehicle is described. The motor vehicle includes a vehicle body, a front wheelhouse, and a frame. The mudflap-integrated aerodynamic member includes a mudflap portion configured to attach to the front wheelhouse and cover at least a portion of the front wheelhouse and an elongated air strake attached to and projecting from the mudflap portion. The elongated air strake includes an elongated strake body extending longitudinally with respect to the vehicle body from an outboard edge contiguous with the mudflap portion to an inboard edge adjacent to the vehicle body.

20 Claims, 4 Drawing Sheets

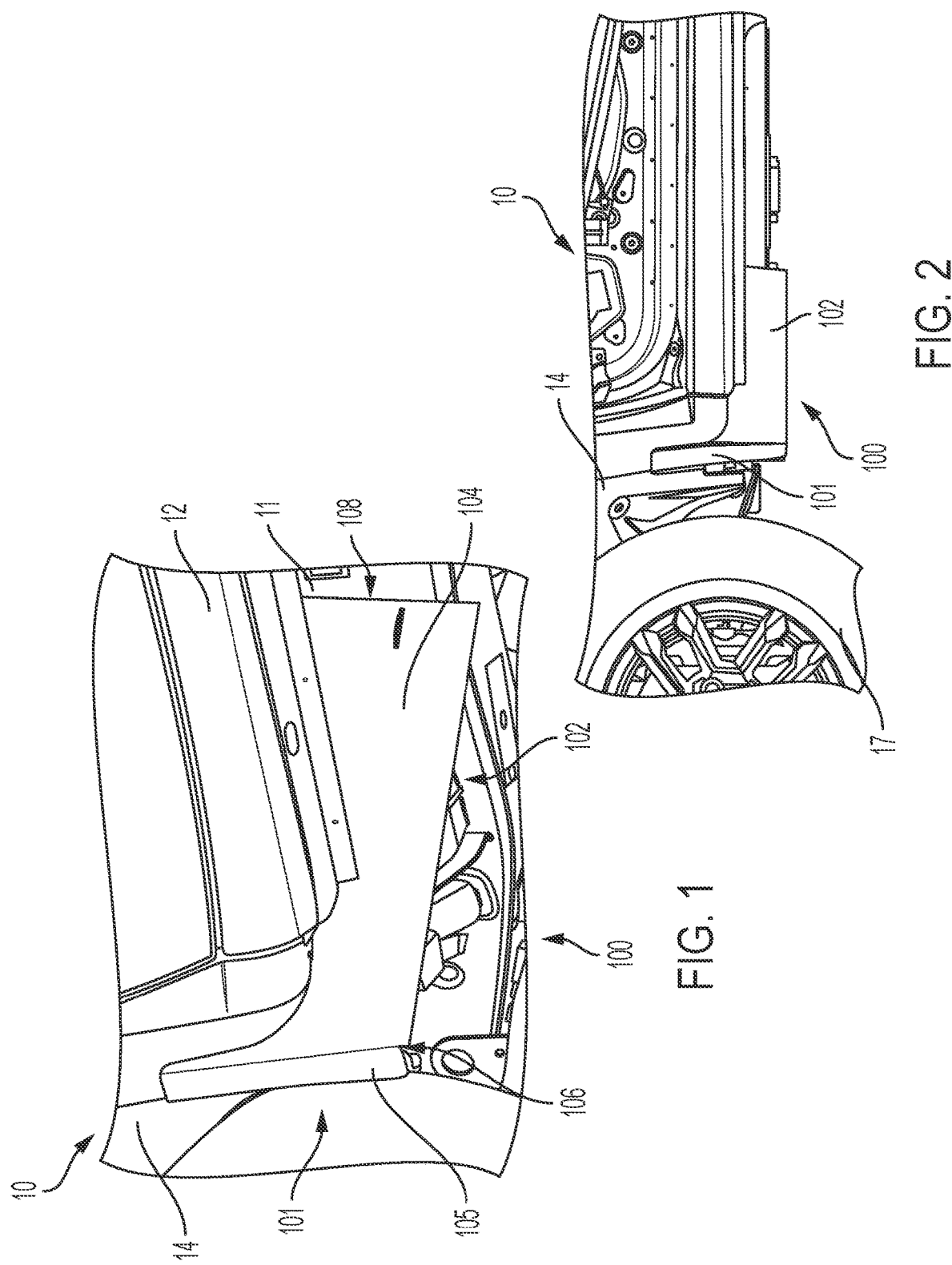

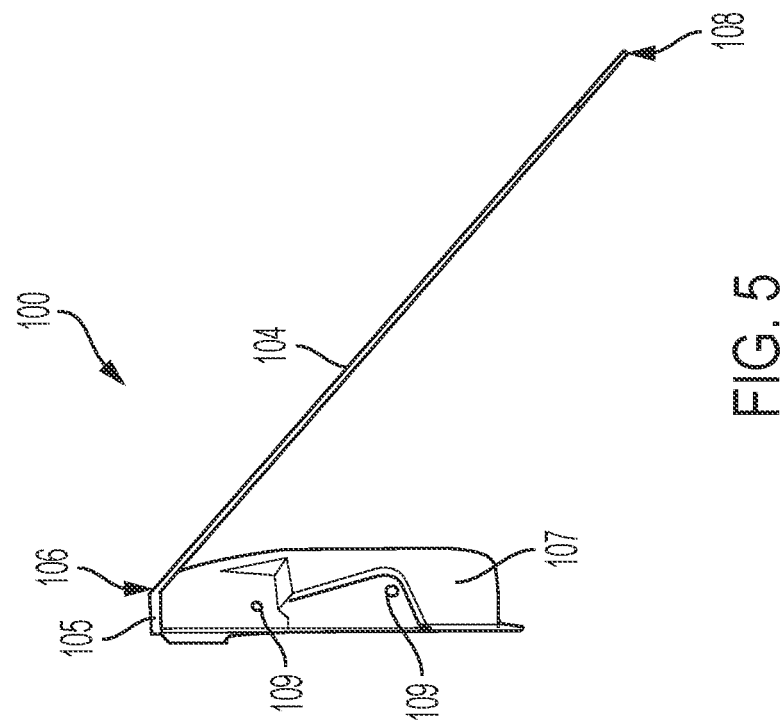
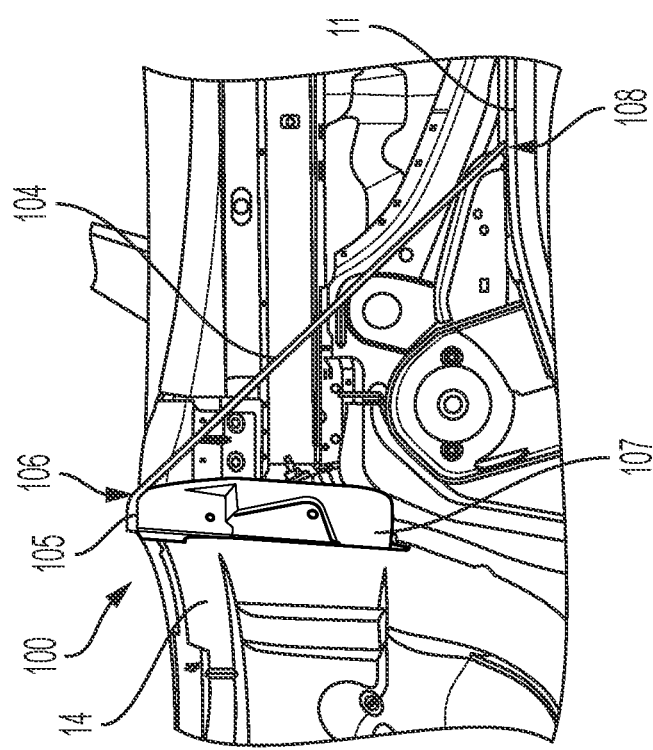
FIG. 5
FIG. 4

MUDFLAP AERO STRAKE

INTRODUCTION

The present disclosure relates generally to a passive mudflap with an aerodynamic strake for reduced aerodynamic drag.

As an automotive vehicle travels, it disturbs the air through which it passes. This air disturbance has an impact on energy consumption of the automotive vehicle, among other factors. Overcoming wind resistance and turbulence generated by the passage of the vehicle expends energy, which must be obtained from fuel, electricity, or other stored energy of the vehicle. The greater the wind resistance and turbulence, the greater the expenditure of fuel and the lower the fuel economy. Vehicles are therefore generally designed with aerodynamic performance in mind. In particular, vehicles are designed to reduce airflow through the wheelhouse and unwanted drag resulting from such airflow.

SUMMARY

Embodiments according to the present disclosure provide a number of advantages. For example, embodiments according to the present disclosure provide improved drag improvement over a traditional mudflap while maintaining the appearance of the traditional mudflap.

In one aspect of the present disclosure, an automotive vehicle includes a vehicle body and a mudflap-integrated aerodynamic member. The vehicle body defines a longitudinal vehicle body axis extending from a front end of the vehicle body to a rear end of the vehicle body, a lateral vehicle body axis extending from a first side of the vehicle body to a second side of the vehicle body opposite the first side, and a vertical axis. The vehicle body has a front wheel and a front wheelhouse disposed around the front wheel. The front wheelhouse includes a wheelhouse surface and a wheelhouse edge defining a wheelhouse opening. The mudflap-integrated aerodynamic member includes a mudflap portion coupled to the front wheelhouse within the wheelhouse opening and extending vertically downward from the wheelhouse edge and an elongated air strake extending from the mudflap portion to a position longitudinally behind the front wheelhouse and adjacent to the vehicle body.

In some aspects, the elongated air strake includes an elongated strake body that extends longitudinally with respect to the vehicle body from an outboard edge adjacent to the front wheelhouse to an inboard edge adjacent to the vehicle body.

In some aspects, the elongated air strake includes an upper edge shaped to conform to the vehicle body.

In some aspects, the mudflap portion includes a first surface adjacent to the wheelhouse surface and a second surface outboard of and contiguous with the first surface.

In some aspects, the mudflap portion includes a lower surface contiguous with the first surface such that the first surface, the second surface, and the lower surface encircle at least an outboard portion of the wheelhouse edge.

In some aspects, the second surface extends vertically below the first surface and includes an inboard-facing curvature.

In some aspects, the elongated air strake projects generally parallel to the vertical axis of the vehicle body and extends from an outboard edge contiguous with the second surface of the mudflap portion to an inboard edge adjacent to the vehicle body.

In some aspects, the elongated air strake includes a lower edge that extends below the inboard-facing curvature of the second surface of the mudflap portion.

In some aspects, the elongated air strake includes an upper edge shaped to conform to the vehicle body to provide a clean visual aesthetic.

In another aspect of the present disclosure, a mudflap-integrated aerodynamic member for improving aerodynamic characteristics of a motor vehicle is described. The motor vehicle includes a vehicle body, a front wheelhouse, and a frame. The aerodynamic member includes a mudflap portion configured to attach to the front wheelhouse and cover at least a portion of the front wheelhouse and an elongated air strake attached to and projecting from the mudflap portion. The elongated air strake includes an elongated strake body extending longitudinally with respect to the vehicle body from an outboard edge contiguous with the mudflap portion to an inboard edge adjacent to the vehicle body.

In some aspects, the mudflap portion includes a first surface adjacent to the wheelhouse surface and a second surface outboard of and contiguous with the first surface.

In some aspects, the mudflap portion includes a lower surface contiguous with the first surface such that the first surface, the second surface, and the lower surface encircle at least an outboard portion of the front wheelhouse.

In some aspects, the second surface extends vertically below the first surface and includes an inboard-facing curvature.

In some aspects, the elongated air strake includes a lower edge that extends below the inboard-facing curvature of the second surface of the mudflap portion.

In some aspects, the elongated air strake projects generally parallel to the vertical axis of the vehicle body and extends from an outboard edge contiguous with the second surface of the mudflap portion to an inboard edge adjacent to the vehicle body.

In some aspects, the elongated air strake includes an upper edge shaped to conform to the vehicle body.

In another aspect of the present disclosure, a method of forming a mudflap-integrated aerodynamic member for improving aerodynamic characteristics of a motor vehicle is described. The motor vehicle includes a vehicle body, a front wheelhouse, and a frame. The method includes forming a mudflap portion configured to attach to the front wheelhouse and cover at least a portion of the front wheelhouse. The mudflap portion includes an inboard-facing curvature. The method also includes attaching an elongated air strake to the mudflap portion such that the elongated air strake projects from the mudflap portion. The elongated air strake includes an elongated strake body extending longitudinally with respect to the vehicle body from an outboard edge contiguous with the mudflap portion to an inboard edge adjacent to the vehicle body. The elongated air strake is configured to guide airflow traveling fore-to-aft along the vehicle body to provide an aerodynamic benefit.

In some aspects, the mudflap portion includes a first surface adjacent to a wheelhouse surface of the front wheelhouse, a second surface outward of and contiguous with the first surface, and a lower surface contiguous with the first surface such that the first surface, the second surface, and the lower surface encircle an outboard edge of the front wheelhouse and the mudflap portion directs fluid and debris.

In some aspects, the forming and the attaching includes integrally forming the mudflap portion and the elongated air strake as a single-piece, unitary structure.

In some aspects, the elongated air strake projects from the mudflap portion generally parallel to a vertical axis of the vehicle body and extends from an outboard edge contiguous with the second surface of the mudflap portion to an inboard edge adjacent to the vehicle body.

BRIEF DESCRIPTION OF THE DRAWINGS

The present disclosure will be described in conjunction with the following figures, wherein like numerals denote like elements.

FIG. 1 is a partial, side rear perspective view of a vehicle including a mudflap-integrated aerodynamic member, according to an embodiment.

FIG. 2 is a partial, side view of a vehicle including a mudflap-integrated aerodynamic member, according to an embodiment.

FIG. 4 is a partial, underbody view of a vehicle including a mudflap-integrated aerodynamic member, according to an embodiment.

FIG. 5 is an underside view of a mudflap-integrated aerodynamic member, according to an embodiment.

Figure 3:
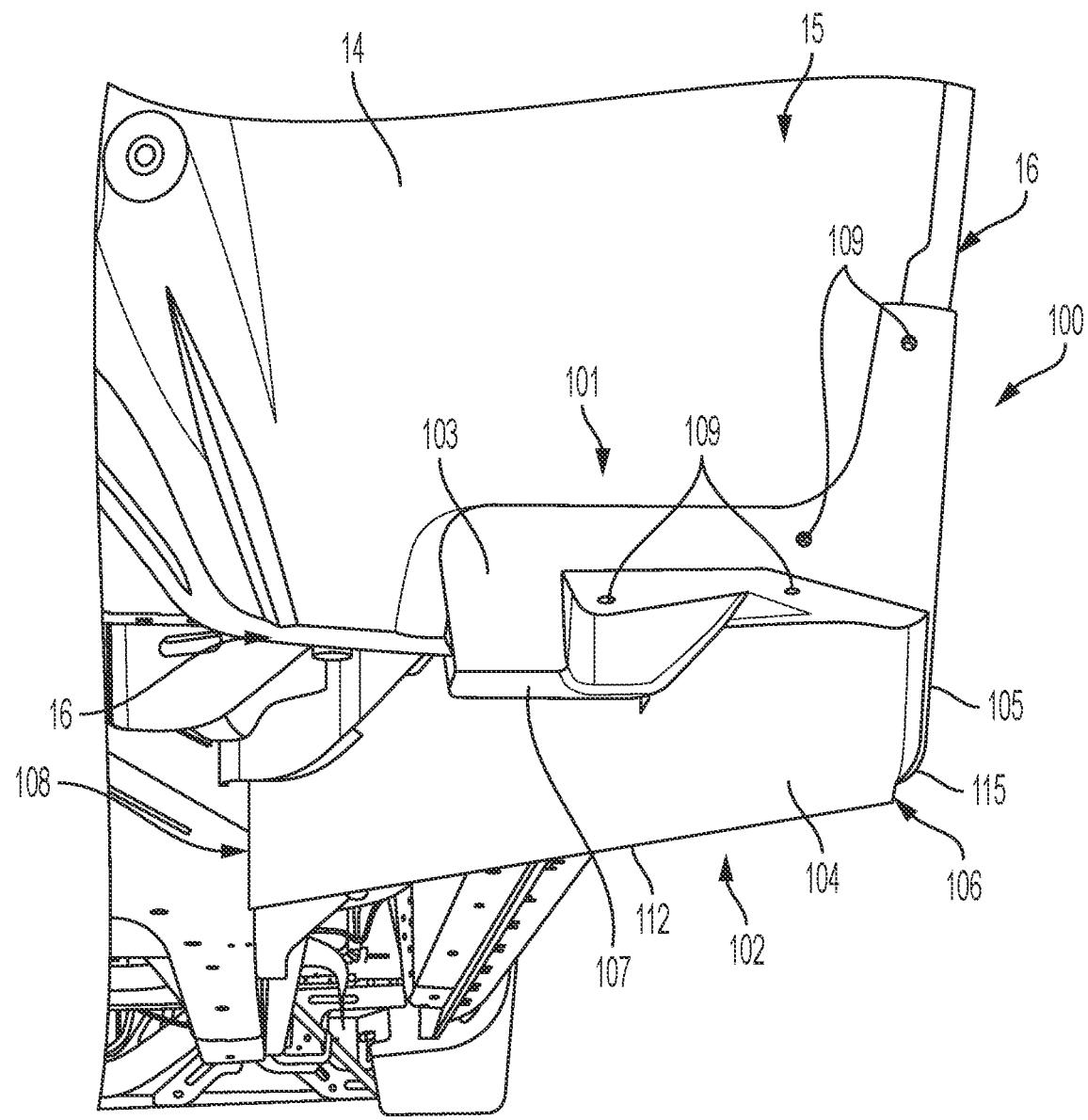
FIG. 3 is a partial, front underbody perspective view of a vehicle including a mudflap-integrated aerodynamic member, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only,

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above derivatives thereof, and words of similar import.

In various embodiments, as discussed herein, a mudflap-integrated aerodynamic member provides improved aerodynamic characteristics for a motor vehicle, including reduced vehicle drag and increased fuel economy or range of an electric vehicle. The mudflap-integrated aerodynamic member includes an air strake that extends from an outboard position of the mudflap near the wheelhouse to an inboard position aft or behind the wheelhouse. The aerodynamic member preserves the appearance and functionality of a traditional mudflap while providing drag improvement over the traditional device.

Referring to the drawings, wherein like reference numbers refer to like components, FIGS. 1-6 illustrate a mudflap-integrated aerodynamic member 100 for improving aerodynamic characteristics of a vehicle 10. In various embodiments, as shown in FIG. 1, the vehicle 10 includes a vehicle body 12 coupled to a vehicle frame 11. The vehicle body 12 defines a longitudinal axis of the vehicle 10.

A front wheelhouse 14 is also coupled to the vehicle frame 11 and is adjacent to or formed integrally with, the vehicle body 12. The front wheelhouse 14 includes a wheelhouse surface 15 and a wheelhouse edge 16. The front wheelhouse 14 at least partially encloses a wheel 17, as shown in FIG. 1.

The mudflap-integrated aerodynamic member 100 includes a mudflap portion 101 and an elongated air strake 102 attached to and projecting from the mudflap portion 101. As used herein and in the general art, an "air strake" or "strake" may include a small, bladelike device that provides an aerodynamic benefit. In various embodiments, the mudflap portion 101 is configured to attach to the front wheelhouse 14 and covers at least a portion of the front wheelhouse 14. In various embodiments, the mudflap portion 101 encircles a lower and outboard portion of the wheelhouse edge 16, as best shown in FIG. 3. In various embodiments, the mudflap portion 101 is secured to the front wheelhouse 14 using one or more mechanical fasteners 109, such as, for example and without limitation, bolts, screws, rivets, etc.

With continued reference to FIG. 3, in various embodiments, the mudflap portion 101 includes a first surface 103 adjacent to the wheelhouse surface 15 and a second surface 105 outboard of and contiguous with the first surface 103. In various embodiments, the second surface 105 extends vertically below the first surface 103 and includes an inboard-facing curvature or curved portion 115. The mudflap portion 101 also includes a lower surface 107. The lower surface 107 is contiguous with the first surface 103 such that the first surface 103, the second surface 105, and the lower surface 107 encircle at least an outboard portion of the wheelhouse edge 16. In various embodiments, the mudflap portion 101 is shaped to direct fluid or debris and functions as a traditional mudflap.

In various embodiments, the elongated air strake 102 is attached to the mudflap portion 101. In some embodiments, the elongated air strake 102 is formed integrally with the mudflap portion 101 as a single-piece, unitary structure. The elongated air strake 102 projects or extends from the mudflap portion 101 longitudinally rearward on the vehicle 10. The elongated air strake 102 includes an elongated strake body 104 that extends longitudinally with respect to the vehicle body 12 from an outboard edge 106 adjacent to the front wheelhouse 14 to an inboard edge 108 adjacent to the vehicle body 12 or the frame 11, as shown in FIGS. 1 and 4. The outboard edge 106 of the elongated air strake 102 connects the second surface 105 and the elongated strake body 104.

In various embodiments, the elongated air strake 102 projects generally parallel to a vertical axis of the vehicle body 12 and extends from the outboard edge 106 contiguous with the second surface 105 of the mudflap portion 101 to the inboard edge 108 adjacent to the vehicle body 12. In various embodiments, the inboard edge 108 is adjacent to the vehicle frame 11, as best shown in FIGS. 1 and 4.

Figure 6:
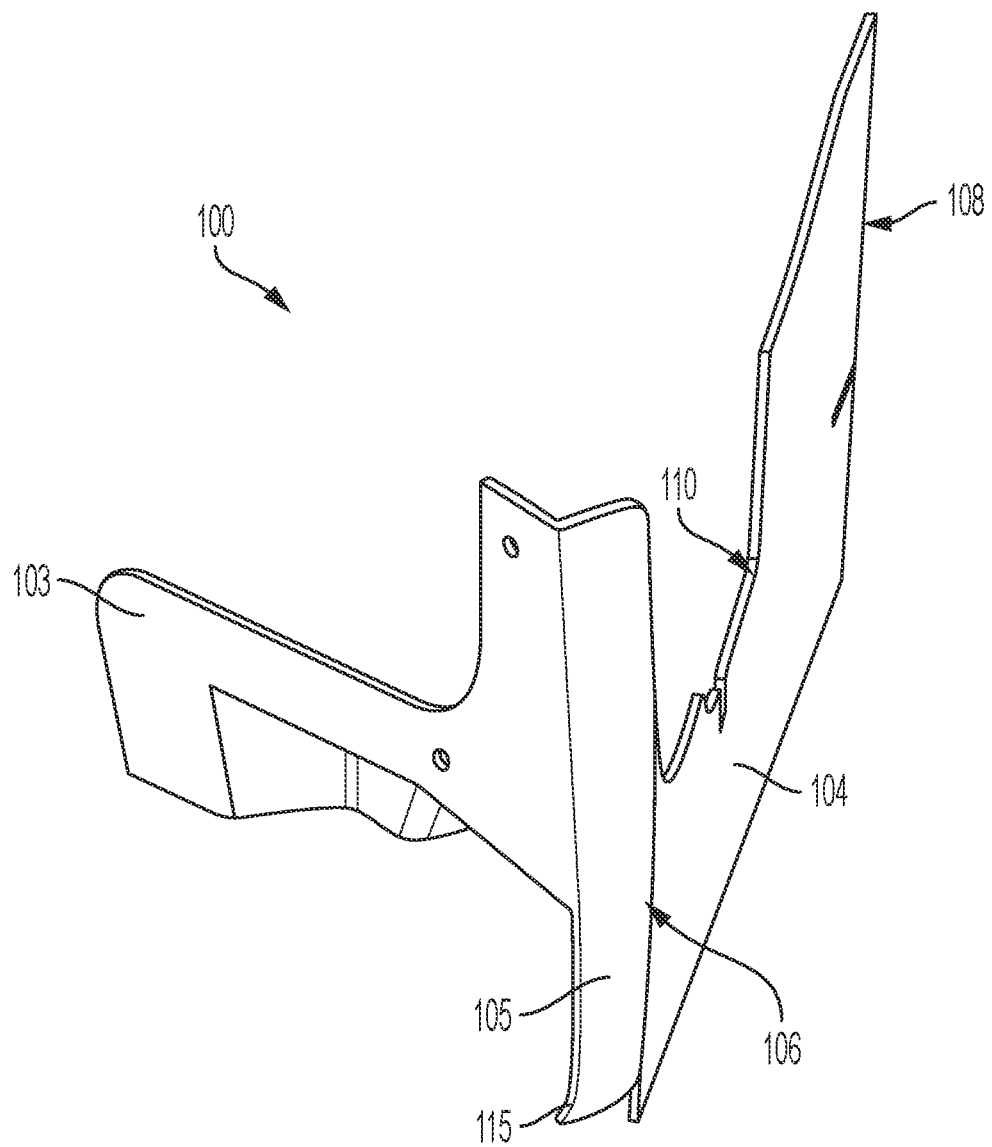
FIG. 6 is a front, perspective view of a mudflap-integrated aerodynamic member, according to an embodiment.

With reference to FIG. 6, in various embodiments, the elongated air strake 102 includes an upper edge 110 shaped to conform to the vehicle body 12 to provide a clean visual aesthetic. The elongated air strake 102 also includes a lower edge 112 that extends below the inboard-facing curvature 115 of the second surface 105 of the mudflap portion 101, as best shown in FIG. 3.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantifies, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle, comprising:
a vehicle body defining a longitudinal vehicle body axis extending from a front end of the vehicle body to a rear end of the vehicle body, a lateral vehicle body axis extending from a first side of the vehicle body to a second side of the vehicle body opposite the first side, and a vertical axis, the vehicle body having a front wheel and a front wheelhouse disposed around the front wheel, the front wheelhouse comprising a wheelhouse surface and a wheelhouse edge defining a wheelhouse opening; and
a mudflap-integrated aerodynamic member comprising:
a mudflap portion coupled to the front wheelhouse within the wheelhouse opening and extending vertically downward from the wheelhouse edge; and
an elongated air strake extending from the mudflap portion to a position longitudinally behind the front wheelhouse and adjacent to the vehicle body.

2. The automotive vehicle of claim 1, wherein the elongated air strake includes an elongated strake body that extends longitudinally with respect to the vehicle body from an outboard edge adjacent to the front wheelhouse to an inboard edge adjacent to the vehicle body.

3. The automotive vehicle of claim 1, wherein the elongated air strake includes an upper edge shaped to conform to the vehicle body.

4. The automotive vehicle of claim 1, wherein the mudflap portion includes a first surface adjacent to the wheelhouse surface and a second surface outboard of and contiguous with the first surface.

5. The automotive vehicle of claim 4, wherein the mudflap portion includes a lower surface contiguous with the first surface such that the first surface, the second surface, and the lower surface encircle at least an outboard portion of the wheelhouse edge.

6. The automotive vehicle of claim 4, wherein the second surface extends vertically below the first surface and includes an inboard-facing curvature.

7. The automotive vehicle of claim 6, wherein the elongated air strake includes a lower edge that extends below the inboard-facing curvature of the second surface of the mudflap portion.

8. The automotive vehicle of claim 4, wherein the elongated air strake projects generally parallel to the vertical axis of the vehicle body and extends from an outboard edge contiguous with the second surface of the mudflap portion to an inboard edge adjacent to the vehicle body.

9. The automotive vehicle of claim 8, wherein the elongated air strake includes an upper edge shaped to conform to the vehicle body to provide a clean visual aesthetic.

10. A mudflap-integrated aerodynamic member for improving aerodynamic characteristics of a motor vehicle, the motor vehicle including a vehicle body defining a longitudinal vehicle body axis extending from a front end of the vehicle body to a rear end of the vehicle body and a vertical axis, a front wheelhouse, and a frame, the aerodynamic member comprising:
   a mudflap portion configured to attach to the front wheelhouse and cover at least a portion of the front wheelhouse; and
   an elongated air strake attached to and projecting from the mudflap portion, the elongated air strake including an elongated strake body extending longitudinally with respect to the vehicle body from an outboard edge contiguous with the mudflap portion to an inboard edge adjacent to the vehicle body.

11. The mudflap-integrated aerodynamic member of claim 10, wherein the mudflap portion includes a first surface adjacent to the wheelhouse surface and a second surface outboard of and contiguous with the first surface.

12. The mudflap-integrated aerodynamic member of claim 11, wherein the mudflap portion includes a lower surface contiguous with the first surface such that the first surface, the second surface, and the lower surface encircle at least an outboard portion of the front wheelhouse.

13. The mudflap-integrated aerodynamic member of claim 11, wherein the second surface extends vertically below the first surface and includes an inboard-facing curvature.

14. The mudflap-integrated aerodynamic member of claim 13, wherein the elongated air strake includes a lower edge that extends below the inboard-facing curvature of the second surface of the mudflap portion.

15. The mudflap-integrated aerodynamic member of claim 11, wherein the elongated air strake projects generally parallel to the vertical axis of the vehicle body and extends from an outboard edge contiguous with the second surface of the mudflap portion to an inboard edge adjacent to the vehicle body.

16. The mudflap-integrated aerodynamic member of claim 10, wherein the elongated air strake includes an upper edge shaped to conform to the vehicle body.

17. A method of forming a mudflap-integrated aerodynamic member for improving aerodynamic characteristics of a motor vehicle, the motor vehicle including a vehicle body, a front wheelhouse, and a frame, the method comprising:
   forming a mudflap portion configured to attach to the front wheelhouse and cover at least a portion of the front wheelhouse, the mudflap portion including an inboard-facing curvature; and
   attaching an elongated air strake to the mudflap portion such that the elongated air strake projects from the mudflap portion, the elongated air strake including an elongated strake body extending longitudinally with respect to the vehicle body from an outboard edge contiguous with the mudflap portion to an inboard edge adjacent to the vehicle body;
   wherein the elongated air strake is configured to guide airflow traveling fore-to-aft along the vehicle body to provide an aerodynamic benefit.

18. The method of claim 17, wherein the mudflap portion includes a first surface adjacent to a wheelhouse surface of the front wheelhouse, a second surface outward of and contiguous with the first surface, and a lower surface contiguous with the first surface such that the first surface, the second surface, and the lower surface encircle an outboard edge of the front wheelhouse and the mudflap portion directs fluid and debris.

19. The method of claim 17, wherein the forming and the attaching includes integrally forming the mudflap portion and the elongated air strake as a single-piece, unitary structure.

20. The method of claim 17, wherein the elongated air strake projects from the mudflap portion generally parallel to a vertical axis of the vehicle body and extends from an outboard edge contiguous with the second surface of the mudflap portion to an inboard edge adjacent to the vehicle body.

* * * * *